US012574782B2

(12) United States Patent

Huang et al.

(10) Patent No.: US 12,574,782 B2

(45) Date of Patent: Mar. 10, 2026

(54) NETWORK CONTROLLED SMALL GAP (NCSG) CONFIGURATIONS TO REDUCE INTERRUPTIONS DUE TO INTRA-RAT BANDWIDTH PART (BWP) TRANSITIONS

(71) Applicant: Intel Corporation, Santa Clara, CA (US)

(72) Inventors: Rui Huang, Beijing (CN); Andrey Chervyakov, Nizhny Novgorod (RU); Youn Hyoung Heo, Sunnyvale, CA (US); Hua Li, Arlington, VA (US); Candy Yiu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 319 days.

(21) Appl. No.: 18/267,869

(22) PCT Filed: Dec. 21, 2021

(86) PCT No.: PCT/US2021/064707

§ 371 (c)(1),
(2) Date: Jun. 16, 2023

(87) PCT Pub. No.: WO2022/150186

PCT Pub. Date: Jul. 14, 2022

(65) Prior Publication Data

US 2024/0098539 A1 Mar. 21, 2024

Related U.S. Application Data

(60) Provisional application No. 63/134,118, filed on Jan. 5, 2021, provisional application No. 63/134,131, filed (Continued)

(51) Int. Cl.
*H04W 24/10* (2009.01)
*H04W 56/00* (2009.01)
*H04W 88/08* (2009.01)

(52) U.S. Cl.
CPC ....... *H04W 24/10* (2013.01); *H04W 56/0015* (2013.01); *H04W 88/08* (2013.01)

(58) Field of Classification Search
CPC .. H04W 88/08; H04W 56/0015; H04W 24/10
See application file for complete search history.

(56) References Cited

U.S. PATENT DOCUMENTS

| | | | |
|---|---|---|---|
| 11,895,547 B2 * | 2/2024 | Tang ................. | H04W 36/0088 |
| 2018/0034598 A1 | 2/2018 | Yiu et al. | |

(Continued)

FOREIGN PATENT DOCUMENTS

| | | |
|---|---|---|
| WO | WO-2017138985 A1 | 8/2017 |
| WO | WO-2018144927 A1 | 8/2018 |

(Continued)

OTHER PUBLICATIONS

"3GPP; TSG RAN; NR; RRC protocol specification (Release 16)", 3GPP TS 38.331 V16.1.0, (Jul. 24, 2020).

(Continued)

*Primary Examiner* — Kamran Afshar

(74) *Attorney, Agent, or Firm* — Schwegman Lundberg & Woessner, P.A.

(57) ABSTRACT

In a fifth-generation (5G) new radio (NR) network, a generation node B (gNB) determines parameters for a Network Controlled Small Gap (NCSG) to reduce and/or eliminate interruptions at a user equipment (UE) for use when the UE is transitioning to a new target frequency for measurements or when the UE is switching or transiting between bandwidth parts (BWPs). The NCSG may be configured to align with one or more fundamental parameters of a legacy measurement gap (MG) pattern to reduce the interruptions.

20 Claims, 8 Drawing Sheets

Related U.S. Application Data on Jan. 5, 2021, provisional application No. 63/134,133, filed on Jan. 5, 2021.

(56) References Cited

U.S. PATENT DOCUMENTS

| | | | |
|---|---|---|---|
| 2019/0045559 A1* | 2/2019 | Huang | H04W 56/001 |
| 2020/0195398 A1 | 6/2020 | Futaki | |
| 2021/0410024 A1* | 12/2021 | Tang | H04W 36/0088 |
| 2023/0180080 A1* | 6/2023 | Li | H04W 8/22 |
| | | | 370/331 |
| 2023/0345286 A1* | 10/2023 | Zhang | H04W 24/10 |
| 2024/0373305 A1* | 11/2024 | Tang | H04W 36/0088 |

FOREIGN PATENT DOCUMENTS

| | | |
|---|---|---|
| WO | WO-2022150186 A1 | 7/2022 |
| WO | WO-2022150186 A9 | 7/2022 |

OTHER PUBLICATIONS

"Impact on existing RRM measurement", R4-2006236, 3GPP RAN WG4 Meeting #95-e, Electronic Meeting, (May 15, 2020).

"International Application Serial No. PCT/US2021/064707, International Preliminary Report on Patentability mailed Apr. 17, 2023", 5 pgs.

"International Application Serial No. PCT/US2021/064707, International Search Report mailed Jun. 2, 2022", 4 pgs.

"International Application Serial No. PCT/US2021/064707, Written Opinion mailed Jun. 2, 2022", 6 pgs.

"European Application Serial No. 21918069.2, Extended European Search Report mailed Nov. 12, 2024", 8 pgs.

Huawei, "NCSG Support in NR", 3GPP Draft; R2-1818471,3rd Generation Partnership Project (3GPP), Mobile Competence Centre ; 650, Route Des Lucioles ; F-06921 Sophia-Antipolis Cedex ; France, vol. RAN WG2, No. Spokane (WA), US, [Online] Retrieved from the internet:http: www.3gpp.org ftp tsg%5Fran WG2705FRL2 TSGR2%5F104 Docs R27o2D181847172Ezip, (Nov. 2, 2018), Nov. 12, 2018-Nov. 16, 2018.

Qualcomm, Incorporated, "Motivations for measurement gap enhancements WI in NR R17", 3GPP Draft; Rp-200999, 3rd Generation Partnership Project (3GPP), Mobile Competence Centre ; 650, Route Des Lucioles ; F-06921 Sophia-Antipolis Cedex France vol. TSG RAN, [Online]. Retrieved from the Internet: URL :https : ftp.3gpp.org tsg_ran TSG_RAN TSGR_88e Docs RP-200999.zip RP-200999.docx, (Jun. 22, 2020), Jun. 29, 2020-Jul. 3, 2020.

* cited by examiner

FIG. 2B

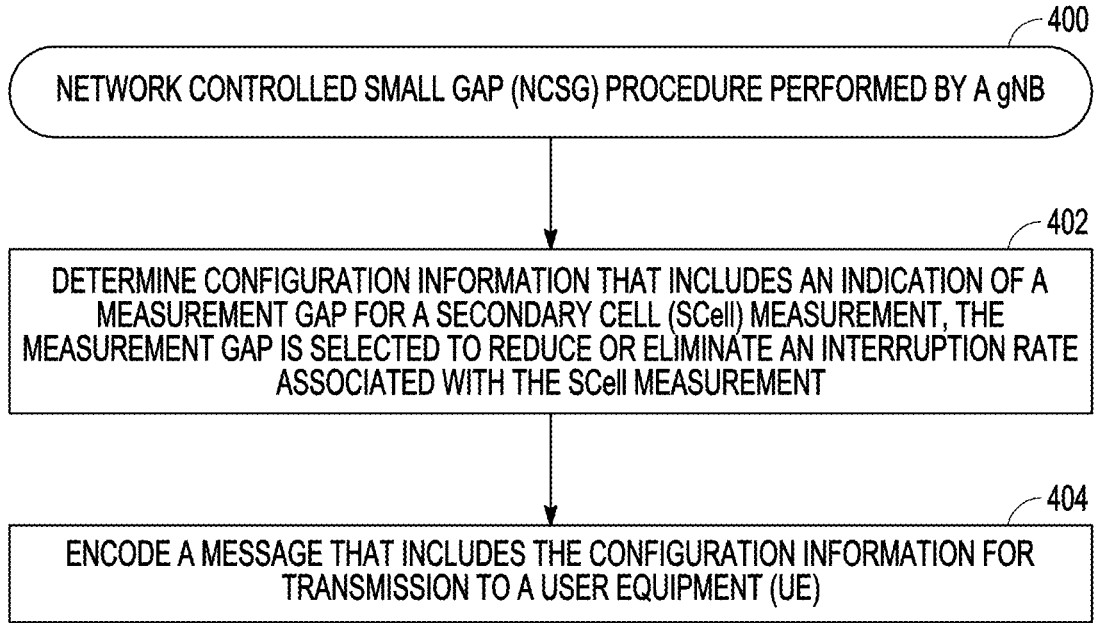

400

NETWORK CONTROLLED SMALL GAP (NCSG) PROCEDURE PERFORMED BY A gNB

402

DETERMINE CONFIGURATION INFORMATION THAT INCLUDES AN INDICATION OF A MEASUREMENT GAP FOR A SECONDARY CELL (SCell) MEASUREMENT, THE MEASUREMENT GAP IS SELECTED TO REDUCE OR ELIMINATE AN INTERRUPTION RATE ASSOCIATED WITH THE SCell MEASUREMENT

404

ENCODE A MESSAGE THAT INCLUDES THE CONFIGURATION INFORMATION FOR TRANSMISSION TO A USER EQUIPMENT (UE)

FIG. 4

NETWORK CONTROLLED SMALL GAP (NCSG) CONFIGURATIONS TO REDUCE INTERRUPTIONS DUE TO INTRA-RAT BANDWIDTH PART (BWP) TRANSITIONS

PRIORITY CLAIMS

This application is a U.S. National Stage Filing under 35 U.S.C. 371 from International Application No. PCT/US2021/064707, filed Dec. 21, 2021 and published in English as WO 2022/150186 on Jul. 14, 2022, which claims priority to U.S. Provisional Patent Application Ser. No. 63/134,118, filed Jan. 5, 2021 [reference number AD4529-Z], U.S. Provisional Patent Application Ser. No. 63/134,131, filed Jan. 5, 2021 [reference number AD4530-Z], and U.S. Provisional Patent Application Ser. No. 63/134,133, filed Jan. 5, 2021 [reference number AD4531-Z], which are incorporated herein by reference in their entireties.

TECHNICAL FIELD

Embodiments pertain to wireless communications. Some embodiments relate to wireless networks including 3GPP (Third Generation Partnership Project) and fifth-generation (5G) networks including 5G new radio (NR) (or 5G-NR) networks. Some embodiments relate to sixth-generation (6G ) networks. Some embodiments relate to Network Controlled Small Gap (NCSG) operations for New Radio (NR).

BACKGROUND

Mobile communications have evolved significantly from early voice systems to today's highly sophisticated integrated communication platform. With the increase in different types of devices communicating with various network devices, usage of 3GPP 5G NR systems has increased. The penetration of mobile devices (e.g., user equipment or UEs) in modern society has continued to drive demand for a wide variety of networked devices in many disparate environments. 5G NR wireless systems are forthcoming and are expected to enable even greater speed, connectivity, and usability, and are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

The time duration during which a UE may suspend communication with a serving cell to perform certain measurements is known as a Measurement Gap (MeasGap). One issue with a conventional measurement gap pattern (MG pattern) is that it may cause interruptions, particularly due to bandwidth part (BWP) transitions or secondary cell (SCell) state transitions.

BRIEF DESCRIPTION OF THE DRAWINGS

FIG. 2B illustrates a NCSG configured as one of several measurement gap instances in accordance with some embodiments.

FIG. 4 illustrates a Network Controlled Small Gap (NCSG) procedure performed by a generation Node B (gNB), in accordance with some embodiments.

DETAILED DESCRIPTION

Figure 1A:
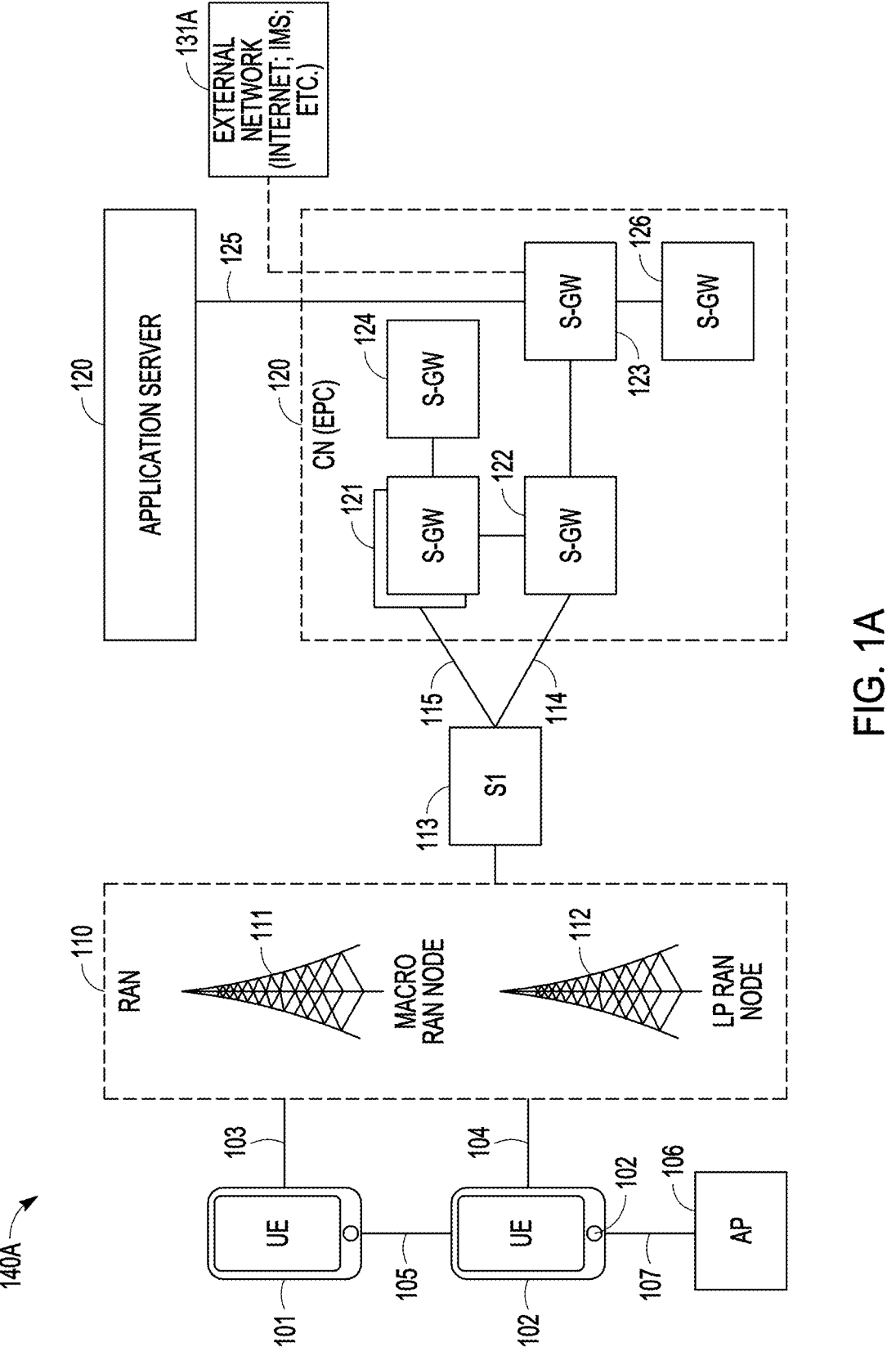
FIG. 1A illustrates an architecture of a network, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments disclosed herein are directed to Network Controlled Small Gap (NCSG) configurations to reduce interruptions, particularly interruptions due to bandwidth part (BWP) transitions or secondary cell (SCell) state transitions.

Some embodiments disclosed herein are directed to configuring user equipment (UE) with a Network Controlled Small Gap (NCSG). Some embodiments are directed to a generation node B (gNB) configured for operation in a fifth-generation (5G) new radio (NR) network. Some embodiments are directed to a gNB configured to determine parameters for a Network Controlled Small Gap (NCSG) to reduce and/or eliminate interruptions at a user equipment (UE) when transitioning to a new target frequency for measurements or when switching or transiting between bandwidth parts (BWPs). In these embodiments, the gNB may encode signalling to configure the UE with the NCSG. The signalling may indicate the NCSG parameters. In these embodiments, the NCSG in NR may be focused on eliminating or reducing the interruption rate due to a transition of a target measurement frequency or BWP, although the scope of the embodiments is not limited in this respect. These embodiments are described in more detail below.

In some embodiments, the NCSG may be configured to align with one or more fundamental parameters of a legacy measurement gap (MG) pattern to reduce the interruptions. In some embodiments, the NCSG may be configured to align a measurement gap length (MGL) (e.g., the total measurement gap duration) of the legacy MG pattern.

In some embodiments, the parameters for the NCSG may include a Visible Interruption Length (VIL), a measurement length (ML) and a visible interruption repetition period (VIRP). In some embodiments, the VIL may be determined based on a deactivated secondary cell component carrier (SCC) to be measured, including based on a frequency range (e.g., either FR1 or FR2) of the deactivated SCC. In some embodiments, the ML may be selected to be up to a length of a synchronization signal block (SSB) based radio-resource management (RRM) measurement timing configuration (SMTC). In some embodiments, the VIRP may be determined based on a measurement cycle configured for a secondary cell (SCell) or another frequency layer.

In some embodiments, the gNB may configure the NCSG for measurement of a legacy measurement resource, by selecting the legacy measurement resource to be included within the ML and the VIL.

In some embodiments, the gNB may generate signalling to configure the UE with a plurality (i.e., multiple) of joint concurrent measurement gap patterns. The NCSG may be one of the concurrent measurement gap patterns of the plurality. In these embodiments, at least one of the joint concurrent measurement gap patterns may be activated for the UE for measurement of positioning reference signals (PRS), and at least another one of the joint concurrent measurement gap patterns may be activated for the UE for radio-resource management (RRM).

In some embodiments, for the joint concurrent measurement gap patterns including the NCSG, the gNB may encode a NeedForGapsConfigNR information element (IE) for transmission to the UE. In these embodiments, the Need-ForGapsConfigNR IE may indicate one or more target NR frequency bands and to request the UE to report measurement gap (MG) requirement information or the one or more target NR frequency bands. In these embodiments, the gNB may decode a NeedForGapsInfoNR IE received from the UE that includes the requirement information. In these embodiments, the parameters for the NCSG are included in a MeasGapConfig IE transmitted to the UE.

In some embodiments, the gNB may encode signalling for transmission to the UE to pre-configure the UE with the NCSG prior to a switch of an activated BWP by the UE. In some embodiments, the gNB may encode further signalling for transmission to the UE to configure the UE with the NCSG for intra-frequency SSB based measurements after the switch of the activated BWP. In some embodiments, the preconfigured NCSG may be included within a period of a BWP inactivity timer. These embodiments are described in more detail below.

Some embodiments are directed to a non-transitory computer-readable storage medium that stores instructions for execution by processing circuitry of a generation node B (gNB) configured for operation in a fifth-generation (5G) new radio (NR) network. In these embodiments, the processing circuitry may determine parameters for a Network Controlled Small Gap (NCSG) to reduce and/or eliminate interruptions at a user equipment (UE) when transitioning to a new target frequency for measurements or when switching or transiting between bandwidth parts (BWPs). These embodiments are described in more detail below.

Figure 2A:
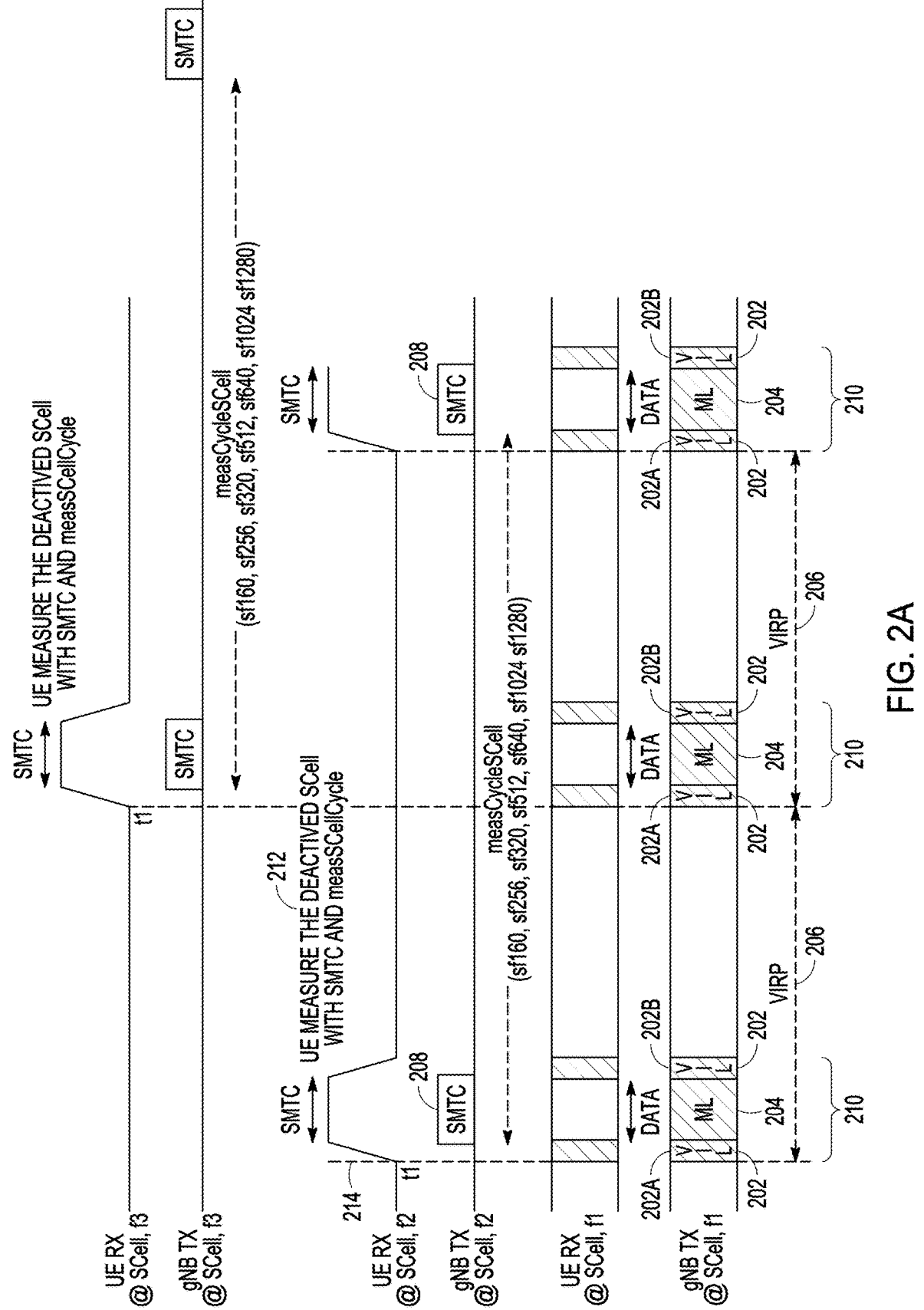
FIG. 2A illustrates example of a Network Controlled Small Gap (NCSG) use scenario, in accordance with some embodiments.

Some embodiments are directed to a user equipment (UE) configured for operation in a fifth-generation (5G) new radio (NR) network. In these embodiments, the UE may decode signalling received from a generation node B (gNB) to configure the UE with a Network Controlled Small Gap (NCSG). The signalling may include parameters for an NCSG pattern 210 (FIG. 2A). In these embodiments, the UE may transition to a new target frequency for performance of measurements in accordance with the NCSG pattern 210 (FIG. 2A) and a legacy measurement gap (MG) pattern. In these embodiments, the NCSG pattern 210 (FIG. 2A) may be aligned a measurement gap length (MGL). These embodiments are described in more detail below.

In these embodiments, the UE may perform measurements during measurement gaps of the NCSG pattern 210 (FIG. 2A) and the legacy MG pattern. In these embodiments, the parameters for may be determined to reduce and/or eliminate interruptions 202 (FIG. 2A) at the UE when transitioning to a new target frequency for measurements or when switching or transiting between bandwidth parts (BWPs) 214 (FIG. 2A). These embodiments are described in more detail below.

In these embodiments, the parameters for the NCSG pattern 210 (FIG. 2A) may include a Visible Interruption Length (VIL) 202A, 202B (FIG. 2A), a measurement length (ML) 204 (FIG. 2A) and a visible interruption repetition period (VIRP) 206 (FIG. 2A). In some of these embodiments, the VIL 202A, 202B (FIG. 2A) may be based on a deactivated secondary cell component carrier (SCC) 212 (FIG. 2A) to be measured, including based on a frequency range (e.g., either FR1 or FR2) of the deactivated SCC. In these embodiments, the ML 204 (FIG. 2A) may be up to a length of a synchronization signal block (SSB) based radio-resource management (RRM) measurement timing configuration (SMTC) 208 (FIG. 2A). In these embodiments, the VIRP 206 (FIG. 2A) may be based on a measurement cycle configured for a secondary cell (SCell) or another frequency layer, although the scope of the embodiments is not limited in this respect.

FIG. 1A illustrates an architecture of a network in accordance with some embodiments. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IoT) UE or a Cellular IoT (CIoT) UE, which can comprise a network access layer designed for low-power IoT applications utilizing short-lived UE connections. In some embodiments, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro-RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018-12). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
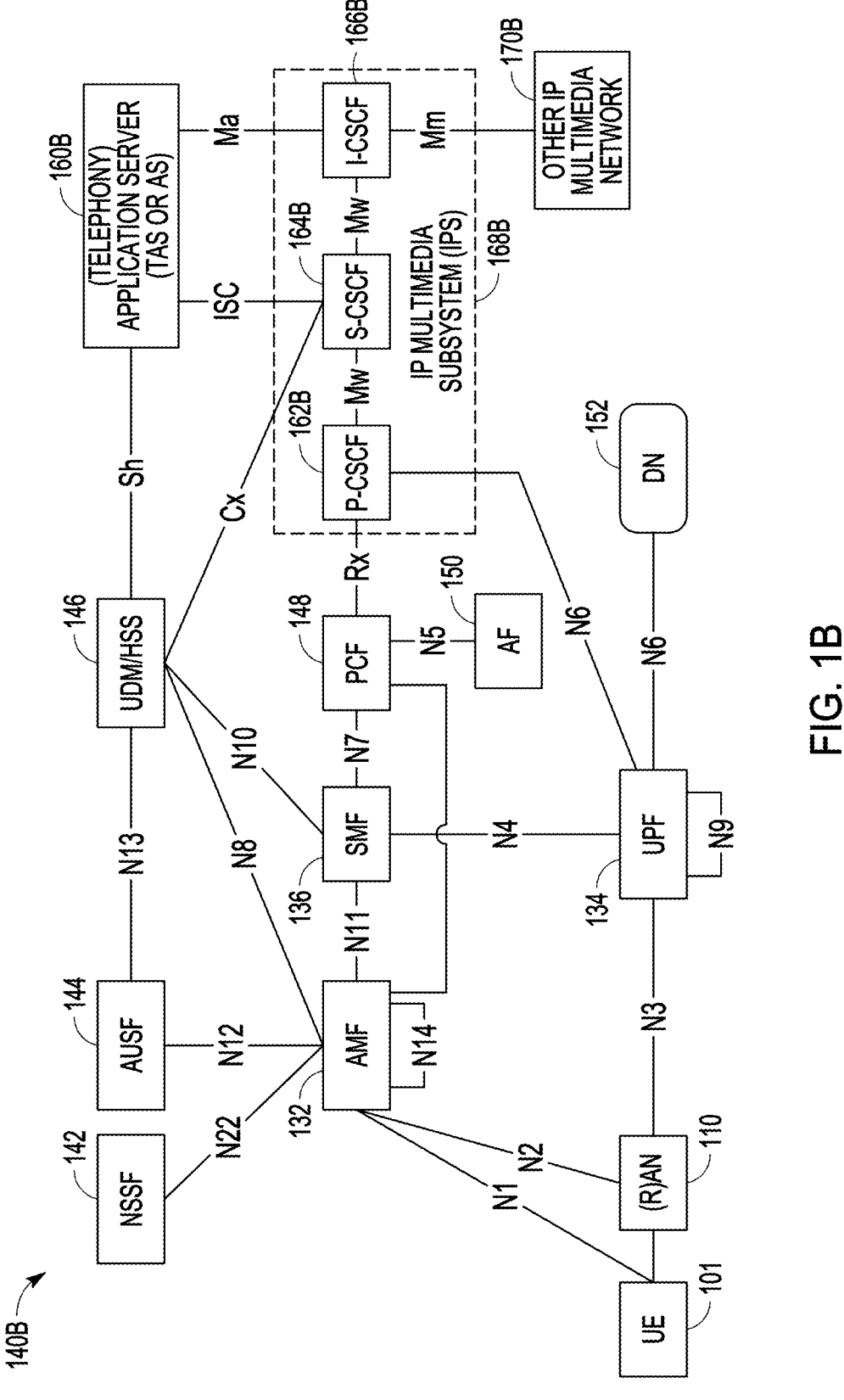
FIG. 1B and FIG. 1C illustrate a non-roaming SG system architecture in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g. an IMS operated by a different network operator.

In some embodiments, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
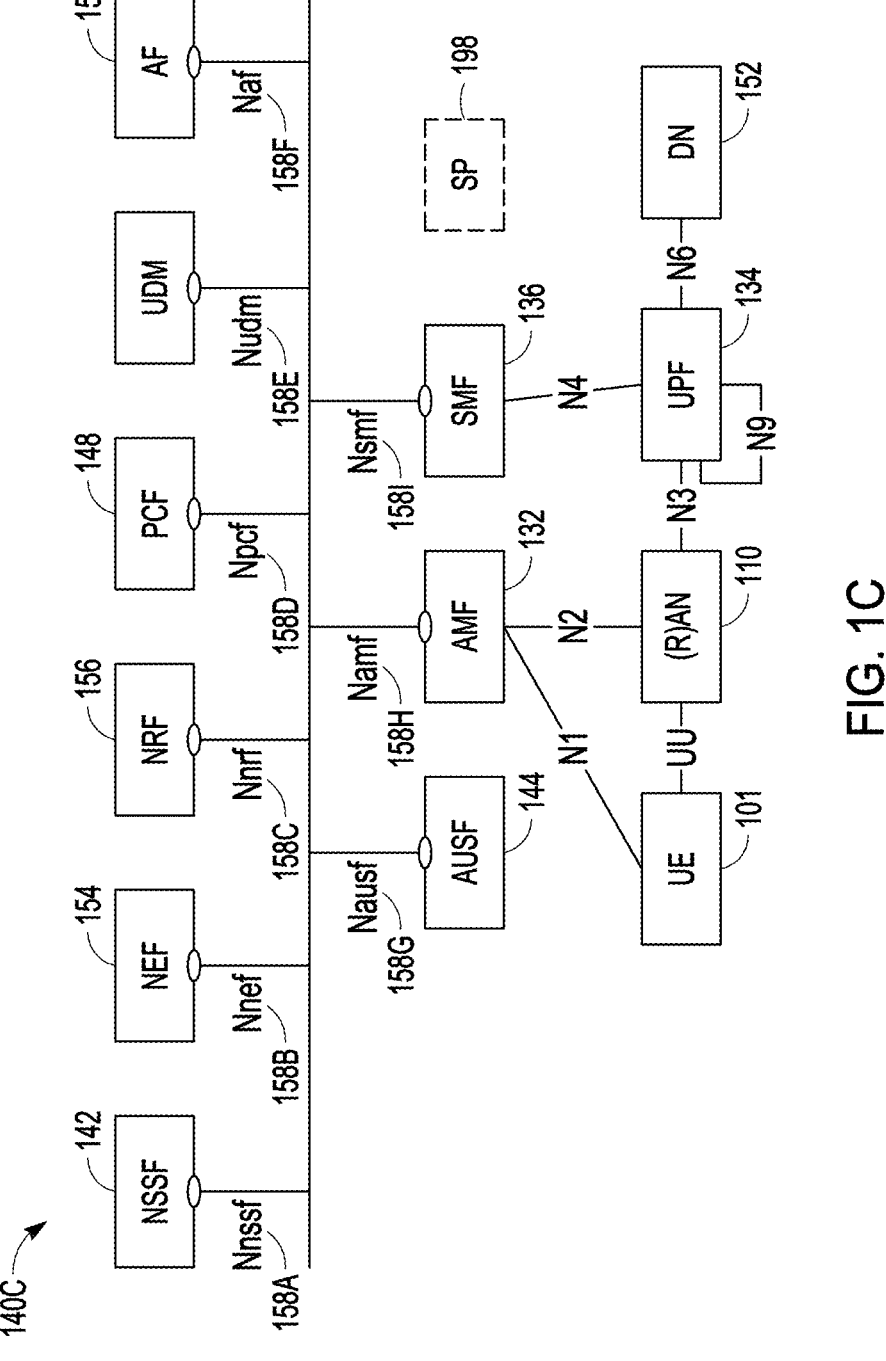

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some embodiments, 5G system architectures can be service-based and interaction between network functions can be represented by corresponding point-to-point reference points Ni or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (es., Nudr. N5g-eir, and Nudsf) not shown in FIG. 1C can also be used.

In some embodiments, any of the UEs or base stations described in connection with FIGS. 1A-1C can be configured to perform the functionalities described herein.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

Rel-15 NR systems are designed to operate on the licensed spectrum. The NR-unlicensed (NR-U), a shorthand notation of the NR-based access to unlicensed spectrum, is a technology that enables the operation of NR systems on the unlicensed spectrum.

A new work item (WI) on NR measurement gap enhancement has been approved in RP #89e. Some embodiments disclosed herein may be directed to one or more of the following:

Network Controlled Small Gap (NCSG) specification
RRM requirements for NCSG
  Requirements for Visible Interruption Length (VIL) for different numerologies in FR1 and FR2
  Specification of NCSG patterns, Measurement Length (ML), and Visible Interruption Repetition Period (VIRP)
  Requirements for DL, reception and UL transmission during ML, before start VIL and after end VIL
  Measurement requirements with NCSG
Specification of applicability of NCSG patterns
Procedures and signaling for NCSG patterns
Some embodiments of the present disclosure are directed to define some new application scenarios with network controlled small gap (NCSG) in NR.

FIG. 2A illustrates example of NR NCSG using scenario, in accordance with some embodiments Firstly, before RAN4 discusses the specific RRM requirements and applicability of NR NCSG patterns, in some embodiments the possible and feasible using scenarios of NCSG in NR may be clarified. In some embodiments, in new radio (NR) systems the measurement on a secondary cell (SCell) may cause interruption to other active carriers. If a user equipment (UE) can support multiple radio frequency (RF) chains, one of which can be used for the measurement for the deactivated carrier as illustrated in FIG. 2A, the network can schedule a gap for this measurement. That is the main task of NCSG in NR can be:

Enable measurement on unused RF chains with interruption controlled on activated CC Eliminate/reduce interruption rate due to deactivated SCell measurement Observation 1: In some embodiments, the following using scenario of NCSG in NR can be considered as a start point: Eliminate/reduce interruption rate due to SCell states transition when measuring the deactivated SCells Meanwhile, regarding to new cases to introduce interruption requirements in NR in comparison with LTE, the other case to reduce the interruption shall be considered, e.g. bandwidth part (BWP) switching. In other words, it may be a benefit to let the UE switch the active BWP with the small gap.

Observation 2: The other using scenario of NCSG in NR can be FFS: Eliminate/reduce interruption rate due to BWP transition On the other hand, in some embodiments, the network can control the interruption by both the legacy gap and NCSG. "Both NCSG and measurement gap (e.g. legacy 6 ms gap) are feasible for interruption control

Embodiment 1

The following using scenario of NCSG in NR can be considered as a start point:

Eliminate/reduce interruption rate due to SCell states transition when measuring the deactivated SCells

Embodiment 2

The other using scenario of NCSG in NR can be:

Eliminate/reduce interruption rate due to BWP transition

Embodiment 3

Both NCSG and measurement gap are feasible for the legacy measurement (e.g. NR SSB based measurement) if the measurement resource can be contained within VIL.

Some embodiments herein define new gap patterns with network controlled small gap (NCSG) in NR. It shall be noted that similar as LTE, the network can control the interruption by both the leagacy gap and NCSG. "Both NCSG and measurement gap (e.g. legacy 6 ms gap) are feasible for interruption control Similar as in LTE, the following using scenario of NCSG in NR can be considered as a start point: Eliminate/reduce interruption rate due to SCell states transition when measuring the deactivated SCells Regarding introduction of NCSG, the critical open issues are on the feasible NCSG patterns definition including Visible Interruption Length (VIL) for different numerologies in FR1 and FR2 and Measurement Length (ML), and Visible Interruption Repetition Period (VIRP) as defined in LTE.

TABLE 8.1.2.1.2-1

| NCSG Pattern Id | Visible interruption length before measurement (VIL1, ms) | Measurement Length during which there is no gap (ML, ms) | Visible interruption length after measurement (VIL2, ms) | Visible interruption Repetition Period (VIRP, ms) | Purpose |
|---|---|---|---|---|---|
| | | | NCSG Configurations supported by the UE | | |
| 0 | 1 | 4 | DL: 1 UL: 2 | 40 | Interruption control according to requirements in sections x.y.x |
| 1 | 1 | 4 | DL: 1 UL: 2 | 80 | Interruption control according to requirements in sections x.y.x |
| 2 | 2 | 3 | 2 | 40 | Interruption control according to requirements in sections x.y.x |
| 3 | 2 | 3 | 2 | 80 | Interruption control according to requirements in sections x.y.x |

Visible Interruption Length (VIL)

In principle, how to decide VIL depends on the feasible RF retuning time which could introduce the unexpected interruption to the serving cells. As in NR Rel15, the assumption on the duration of RF retuning in LTE/NR PCell/PSCell can be less than 500 us and 250 us for FR1 and FR2 respectively. In our view, in Rel17 the same assumption can be reused.

Ideally, VIL can be different with numerlogy of measured SCCs. Considering the interruption in case of both synchronous and asynchronous DC are different in MR DC, the That is the VIL for the different numerologies can be defined as:

| NR Slot | | VIL | |
|---|---|---|---|
| | length (ms) | Sync | Async |
| 0 | 1 | 1 | 2 |
| 1 | 0.5 | 1 | 2 |
| 2 | 0.25 | | 3 |
| 3 | 0.125 | | 5 |

However, such NCSG depending on numerology needs more complicated signaling. Thus, we suggest that we can define VIL per FR.

Proposal 3: VIL could be considered for FR1 and FR2 as a baseline if it is technically feasible

| NR Slot | | VIL | |
|---|---|---|---|
| | length (ms) | Sync | Async |
| FR1 | | 1 | 2 |
| FR2 | | 0.75 | |

Measurement Length (ML)

Measurement length could be dependent on measurement object configuration. For SSB measurement, ML is up to SMTC configuration. Hence ML defined in NR legacy gap patterns can be feasible.

Visible Interruption Repetition Period (VIRP)

VIRP can depend on the SCell measurement cycle configure for SCell. And regarding to such NCSG will be applicable for all SCell carriers, if there are multiple deactivated SCells to be measured, more than one NCSG are needed. That is the VIRP can be less than measCycleSCell. Meanwhile, it is better to align these SMTC window for multiple SCell.

```
MeasObjectNR ::=              SEQUENCE {
    ssbFrequency             ARFCN-ValueNR
OPTIONAL,    -- Cond SSBorAssociatedSSB
    ssbSubcarrierSpacing         SubcarrierSpacing
OPTIONAL,    -- Cond SSBorAssociatedSSB
    smtc1                    SSB-MTC
OPTIONAL,    -- Cond SSBorAssociatedSSB
    smtc2                    SSB-MTC2
OPTIONAL,    -- Cond IntraFreqConnected
    ......
    measCycleSCell           ENUMERATED {sf160, sf256, sf320,
sf512, sf640, sf1024, sf1280} OPTIONAL    -- Need R
    ]],
    [[
    smtc3list-r16            SSB-MTC3List-r16
OPTIONAL,    -- Need R
    rmtc-Config-r16          SetupRelease {RMTC-Config-r16}
OPTIONAL,    -- Need M
    t312-r16                 SetupRelease { T312-r16 }
OPTIONAL    -- Need M
    ]]
}
```

In short summary, for ML and VIRP parameters of NR NCSG pattern, it is quite important to determine whether the legacy gap pattern can be reused for NCSG.

Observation 2: The legacy MG patterns below may be reused as the framework to define NCSG in NR.

But from the technical concerns, some of them could be skipped. For an example, the gap patterns which have the quite shorter MGRP/VIRP (e.g. 20 ms), in case of SCell measurement with "measCycleSCell" configuration, it seems no necessary to defined the same NCSG. And gap #24, 25 which is used for PRS measurement, can be not in the candidate NCSG patterns.

The gap patterns for NR NCSG can be based on existing NR legacy measurement gaps as a start point as shown in the table below.

Gap Pattern Configurations

| Gap Pattern Id | Measurement Gap Length (MGL, ms) | Measurement Gap Repetition Period (MGRP, ms) |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |

-continued

| Gap Pattern Id | Measurement Gap Length (MGL, ms) | Measurement Gap Repetition Period (MGRP, ms) |
|---|---|---|
| 9 | 4 | 160 |
| ~~10~~ | ~~3~~ | ~~20~~ |
| 11 | 3 | 160 |
| ~~12~~ | ~~5.5~~ | ~~20~~ |
| 13 | 5.5 | 40 |
| 14 | 5.5 | 80 |
| 15 | 5.5 | 160 |
| ~~16~~ | ~~3.5~~ | ~~20~~ |
| 17 | 3.5 | 40 |
| 18 | 3.5 | 80 |
| 19 | 3.5 | 160 |
| ~~20~~ | ~~1.5~~ | ~~20~~ |
| 21 | 1.5 | 40 |
| 22 | 1.5 | 80 |
| 23 | 1.5 | 160 |
| ~~24~~ | ~~10~~ | ~~80~~ |
| ~~25~~ | ~~20~~ | ~~160~~ |

If the measurement length can reuses the existing ones for other NR measurement, the length (ML) will can be "MGL-2*VIL", which are defined in the table above. For VIRP, the can same as MGRP.

Therefore, in short summary the NCSG pattern can be defined as:

Embodiment 1

Gap Pattern Configurations (per FR)

| Gap Pattern Id | VIL1 (MGL, ms) | ML | VIL2 | Measurement Gap Repetition Period (VIRP, ms) |
|---|---|---|---|---|
| ncsg0 | 1, sync 2, async | 6 - 2*1, sync 6 - 2*2, async | 1, sync 2, async | 40 |

-continued

| Gap Pattern Id | VIL1 (MGL, ms) | ML | VIL2 | Measurement Gap Repetition Period (VIRP, ms) |
|---|---|---|---|---|
| ncsg 1 | 1, sync 2, async | 6 - 2*1, sync 6 - 2*2, async | 1, sync 2, async | 80 |
| 2 | 1, sync ~~2, async~~ | 3 - 2*1, sync ~~3 - 2*2, async~~ | 1, sync ~~2, async~~ | 40 |
| 3 | 1, sync 2, async | 3 - 2*1, sync ~~3 - 2*2, async~~ | 1, sync ~~2, async~~ | 80 |
| ~~4~~ | | ~~6~~ | | ~~20~~ |
| 5 | 1, sync 2, async | 6 - 2*1, sync 6 - 2*2, async | 1, sync 2, async | 160 |
| ~~6~~ | | ~~4~~ | | ~~20~~ |
| 7 | 1, sync ~~2, async~~ | 4 - 2*1, sync ~~4 - 2*2, async~~ | 1, sync ~~2, async~~ | 40 |
| 8 | 1, sync ~~2, async~~ | 4 - 2*1, sync ~~4 - 2*2, async~~ | 1, sync ~~2, async~~ | 80 |
| 9 | 1, sync ~~2, async~~ | 4 - 2*1, sync ~~4 - 2*2, async~~ | 1, sync ~~2, async~~ | 160 |
| ~~10~~ | | ~~3~~ | | ~~20~~ |
| 11 | 1, sync 2, async | 3 - 2*1, sync ~~3 - 2*2, async~~ | 1, sync ~~2, async~~ | 160 |
| ~~12~~ | | ~~5.5~~ | | ~~20~~ |
| 13 | 0.75, sync + async | 5.5 - 2*0.75, | 0.75, sync + async | 40 |
| 14 | 0.75, sync + async | 5.5 - 2*0.75, | 0.75, sync + async | 80 |
| 15 | 0.75, sync + async | 5.5 - 2*0.75, | 0.75, sync + async | 160 |
| ~~16~~ | | ~~3.5~~ | | ~~20~~ |
| 17 | 0.75, sync + async | 3.5 - 2*0.75, | 0.75, sync + async | 40 |
| 18 | 0.75, sync + async | 3.5 - 2*0.75, | 0.75, sync + async | 80 |
| 19 | 0.75, sync + async | 3.5 - 2*0.75. | 0.75, sync + async | 160 |
| ~~20~~ | | ~~1.5~~ | | ~~20~~ |
| ~~21~~ | | ~~1.5~~ | | ~~40~~ |
| ~~22~~ | | ~~1.5~~ | | ~~80~~ |
| ~~23~~ | | ~~1.5~~ | | ~~160~~ |

Embodiment 2

Gap Pattern Configurations (per CC)

| Gap Pattern Id | VIL1 (MGL, ms) | ML | VIL2 | Measurement Gap Repetition Period (VIRP, ms) |
|---|---|---|---|---|
| ncsg0 | $1*2^{(-u)}$ (u = 0, 1), sync $2*2^{(-u)}$ (u = 0, 1), async $3*2^{(-u)}$ (u = 3), sync &async | $6 - 2*2^{(-u)}$ | $1*2^{(-u)}$ | 40 |
| ncsg 1 | $1*2^{(-u)}$ (u = 0, 1), sync $2*2^{(-u)}$ (u = 0, 1), async $3*2^{(-u)}$ (u = 3), sync &async | $6 - 2*2^{(-u)}$ | $1*2^{(-u)}$ | 80 |
| 2 | $1*2^{(-u)}$ | $3-1*2^{(-u)}$ | $1*2^{(-u)}$ | 40 |
| 3 | | 3 | | 80 |
| ~~4~~ | | ~~6~~ | | ~~20~~ |
| 5 | | 6 | | 160 |
| ~~6~~ | | ~~4~~ | | ~~20~~ |
| 7 | | 4 | | 40 |
| 8 | | 4 | | 80 |
| 9 | | 4 | | 160 |
| ~~10~~ | | ~~3~~ | | ~~20~~ |
| 11 | | 3 | | 160 |
| ~~12~~ | | ~~5.5~~ | | ~~20~~ |

-continued

| Gap Pattern Id | VIL1 (MGL, ms) | ML | VIL2 | Measurement Gap Repetition Period (VIRP, ms) |
|---|---|---|---|---|
| 13 | $1*2^{(-u)}$ (u = 0, 1, 2) | 5.5 | | 40 |
| 14 | | 5.5 | | 80 |
| 15 | | 5.5 | | 160 |
| ~~16~~ | | ~~3.5~~ | | ~~20~~ |
| 17 | | 3.5 | | 40 |
| 18 | | 3.5 | | 80 |
| 19 | | 3.5 | | 160 |
| ~~20~~ | | ~~1.5~~ | | ~~20~~ |
| ~~21~~ | | ~~1.5~~ | | ~~40~~ |
| ~~22~~ | | ~~1.5~~ | | ~~80~~ |
| ~~23~~ | | ~~1.5~~ | | ~~160~~ |

Embodiment 3

Both NCSG and measurement gap (e.g. legacy 6 ms gap) are feasible for interruption control.

Some embodiments herein provide new application scenarios when NCSG was configured as one of gaps by the multiple concurrent gap pattern in NR.

Embodiment 1

On the other hand, in our understanding, it shall be noted that similar as LTE, the network can control the interruption by both the legacy gap and NCSG. Both NCSG and measurement gap (e.g. legacy 6 ms gap) are feasible for interruption control On the other hand, NCSG can be used for UE's measurement (e.g. SSB measurement) if the measurement resource can be contained within VIL.

Referring to FIG. 2A, a UE capable of supporting a Network Controlled Small Gap (NCSG) may decode signalling received gNB to configure the UE with a NCSG configuration for a NCSG pattern 210. The NCSG pattern 210 is configured with interruptions 202 at the UE. The NCSG configuration includes parameters comprising a first Visible Interruption Length (VIL1) 202A, a second VIL (VIL2) 202B, a measurement length (ML) 204 and a visible interruption repetition period (VIRP) 206. The VL1 202A comprises an interruption before the ML 204 of the NCSG pattern 210 and the VIL2 202B comprises an interruption after the ML 204 of the NCSG pattern 210. The NCSG pattern 210 repeats every VIRP 206. The UE is configured to perform synchronization signal block (SSB) based intrafrequency measurements on a deactivated secondary cell (Scell) 212 in accordance with the NCSG pattern 210 after the UE switches bandwidth parts (BWPs) 214.

Figure 2B:
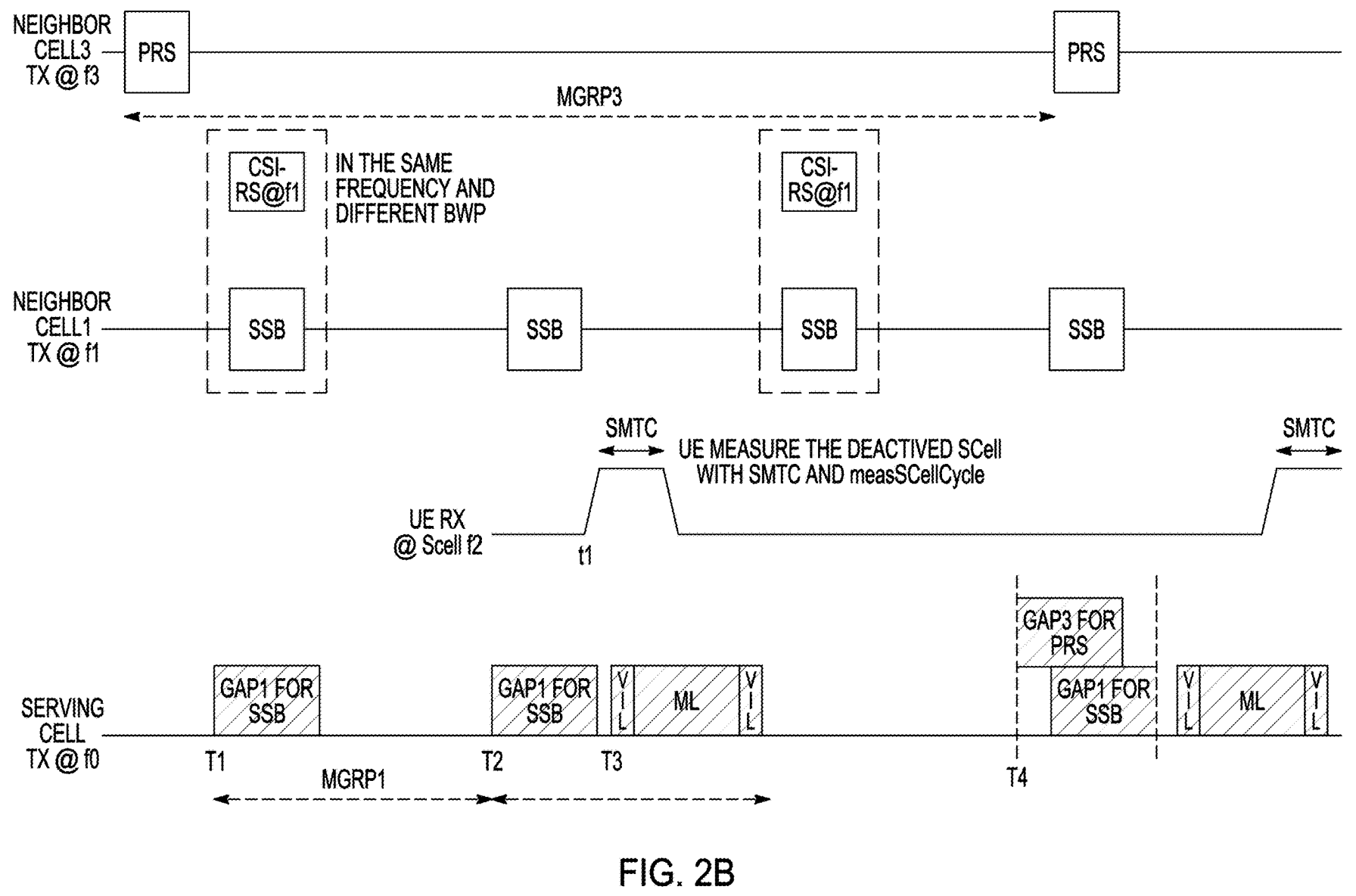

FIG. 2B illustrates NCSG configured as one of several measurement gap instances in accordance with some embodiments. Also in NR Rel17, the multiple concurrent gap patterns can be configured for UE measurements. Thus NCSG can be configured as one of measurement gap instance as shown in FIG. 2B.

Figure 3:
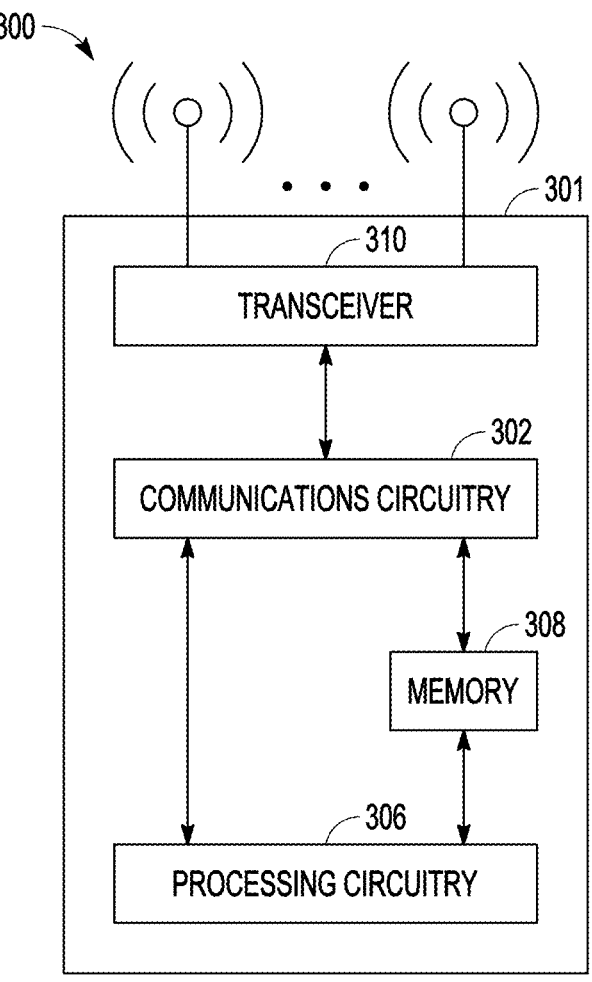
FIG. 3 illustrates a functional block diagram of a wireless communication device, in accordance with some embodiments.

FIG. 3 illustrates a functional block diagram of a wireless communication device, in accordance with some embodiments. Wireless communication device 300 may be suitable for use as a UE or gNB configured for operation in a 5G NR network.

The communication device 300 may include communications circuitry 302 and a transceiver 310 for transmitting and receiving signals to and from other communication devices using one or more antennas 301. The communications circuitry 302 may include circuitry that can operate the physical layer (PHY) communications and/or medium access control (MAC) communications for controlling access to the wireless medium, and/or any other communications layers for transmitting and receiving signals. The communication device 300 may also include processing circuitry 306 and memory 308 arranged to perform the operations described herein. In some embodiments, the communications circuitry 302 and the processing circuitry 306 may be configured to perform operations detailed in the above figures, diagrams, and flows.

In accordance with some embodiments, the communications circuitry 302 may be arranged to contend for a wireless medium and configure frames or packets for communicating over the wireless medium. The communications circuitry 302 may be arranged to transmit and receive signals. The communications circuitry 302 may also include circuitry for modulation/demodulation, upconversion/downconversion, filtering, amplification, etc. In some embodiments, the processing circuitry 306 of the communication device 300 may include one or more processors. In other embodiments, two or more antennas 301 may be coupled to the communications circuitry 302 arranged for sending and receiving signals. The memory 308 may store information for configuring the processing circuitry 306 to perform operations for configuring and transmitting message frames and performing the various operations described herein. The memory 308 is configured to store parameters for the NCSG configuration. The memory 308 may include any type of memory, including non-transitory memory, for storing information in a form readable by a machine (e.g., a computer). For example, the memory 308 may include a computer-readable storage device, read-only memory (ROM), random-access memory (RAM), magnetic disk storage media, optical storage media, flash-memory devices and other storage devices and media.

In some embodiments, the communication device 300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 300 may include one or more antennas 301. The antennas 301 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 300 may include one or more of a keyboard, a display, a non-volatile memory port, multiple antennas, a graphics processor, an application processor, speakers, and other mobile device elements. The display may be an LCD screen including a touch screen.

Although the communication device 300 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 300 may refer to one or more processes operating on one or more processing elements.

FIG. 4 illustrates a Network Controlled Small Gap (NCSG) procedure performed by a gNB, in accordance with some embodiments. Operation 402 comprises determining configuration information that includes an indication of a measurement gap for a secondary cell (SCell) measurement. The measurement gap may be selected to reduce or eliminate an interruption rate associated with the SCell measurement. Operation 404 comprises encoding a message that includes the configuration information for transmission to a user equipment (UE).

Figure 5:
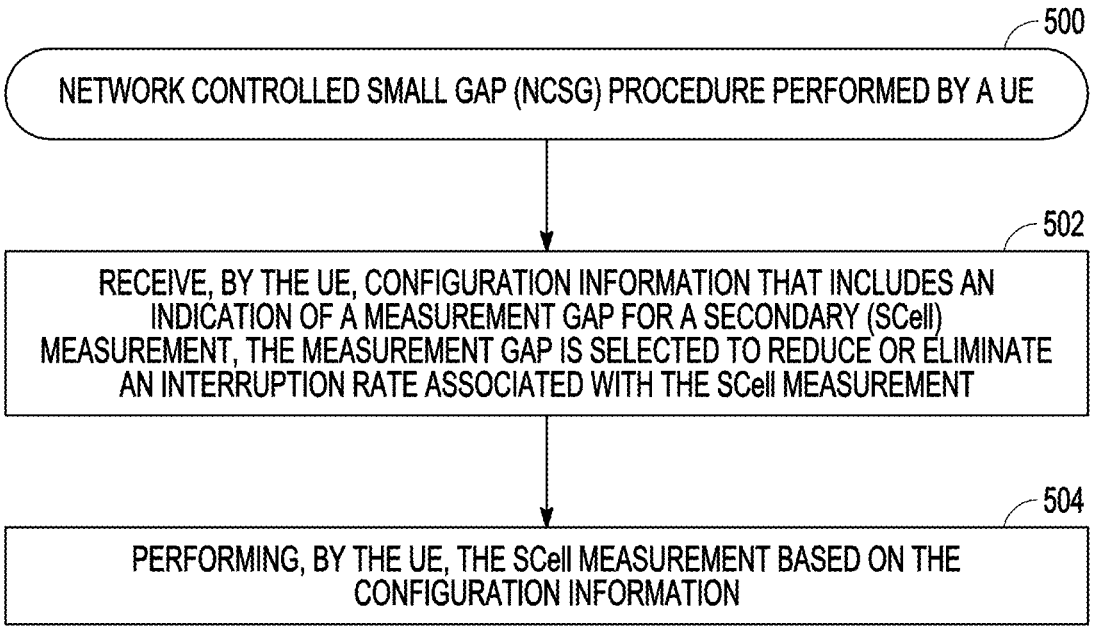
FIG. 5 illustrates a Network Controlled Small Gap (NCSG) procedure performed by a UE, in accordance with some embodiments.

FIG. 5 illustrates a Network Controlled Small Gap (NCSG) procedure performed by a UE. In operation 502, the UE may receive configuration information that includes an indication of a measurement gap for a secondary cell (SCell) measurement. The measurement gap may be selected to reduce or eliminate an interruption rate associated with the SCell measurement. In operation 504, the UE may perform the SCell measurement based on the configuration information.

EXAMPLES

Example A1 may include the method to define UE measurement capability herein, wherein the measurement gaps can be pre-configured before UE switching its activated BWP.

Example A2 may include the method of Example A1 or some other Example herein, wherein these measurement can be intra-frequency SSB based measurement after BWP switching.

Example A3 may include the method of Example A1 or some other Example herein, wherein the pre-configured patterns can be larger than one.

Example A4 may include the method of Example A3 or some other Example herein, wherein only part of these pre-configured patterns can be activated for the concurrent measurement after BWP switching.

Example A5 may include the method of Example A3 or some other Example herein, wherein the activated pre-configured gap is for the measurement reference signal which can be included within bwp-InactivityTimer.

Example A6 may include the method of Example A2 or some other Example herein, wherein the multiple concurrent measurement gaps can be autonomously selected by the serving gNB and UE depending on the known measurement configurations (e.g. SMTC for SSB based measurement).

Example A7 may include the method of Example A1 or some other Example herein, where in NCSG and measurement gap are feasible for the legacy measurement) if the measurement resource can be contained within the VIL.

Example A8 includes a method comprising: determining configuration information that includes an indication of a measurement gap for a secondary cell (SCell) measurement, wherein the measurement gap is selected to reduce or eliminate an interruption rate associated with the SCell measurement; and encoding a message that includes the configuration information for transmission to a user equipment (UE).

Example A9 includes the method of Example A8 or some other Example herein, wherein the interruption rate is associated with an SCell states transition related to measurement of a deactivated SCell.

Example A10 includes the method of Example A8 or some other Example herein, wherein the interruption rate is associated with a bandwidth part (BWP) transition.

Example A11 includes the method of Example A8 or some other Example herein, wherein the measurement gap comprises a 6 ms gap.

Example A12 includes the method of Example A8 or some other Example herein, wherein the SCell measurement is associated with an intra-frequency synchronization signal block (SSB) after BWP switching.

Example A13 includes the method of Example A8 or some other Example herein, wherein the configuration information includes a pre-configured pattern associated with the measurement gap.

Example A14 includes the method of Example A13 or some other Example herein, wherein the configuration information includes a plurality of pre-configured patterns associated with the measurement gap.

Example A15 includes the method of Example A13 or some other Example herein, wherein a portion of the pre-configured pattern is for activation for a concurrent measurement after BWP switching.

Example A16 includes the method of Example A13 or some other Example herein, wherein an activated pre-configured gap for a measurement reference signal is included within a bwp-InactivityTimer field in the configuration information.

Example A17 includes the method of any of examples 8-16 or some other Example herein, wherein the method is performed by a next-generation NodeB (gNB) or portion thereof.

Example A18 includes a method of a user equipment (UE) comprising: receiving, by the UE, configuration information that includes an indication of a measurement gap for a secondary cell (SCell) measurement, wherein the measurement gap is selected to reduce or eliminate an interruption rate associated with the SCell measurement; and performing, by the UE, the SCell measurement based on the configuration information.

Example A19 includes the method of Example A18 or some other Example herein, wherein the interruption rate is associated with an SCell states transition related to measurement of a deactivated SCell.

Example A20 includes the method of Example A18 or some other Example herein, wherein the interruption rate is associated with a bandwidth part (BWP) transition.

Example A21 includes the method of Example A18 or sonic other Example herein, wherein the measurement gap comprises a 6 ms gap.

Example A22 includes the method of Example A18 or some other Example herein, wherein the SCell measurement is associated with an intra-frequency synchronization signal block (SSB) after BWP switching.

Example A23 includes the method of Example A18 or some other Example herein, wherein the configuration information includes a pre-configured pattern associated with the measurement gap.

Example A24 includes the method of Example A23 or some other Example herein, wherein the configuration information includes a plurality of pre-configured patterns associated with the measurement gap.

Example A25 includes the method of Example A23 or some other Example herein, wherein a portion of the pre-configured pattern is for activation for a concurrent measurement after BWP switching.

Example A26 includes the method of Example A23 or some other Example herein, wherein an activated pre-configured gap for a measurement reference signal is included within a bwp-InactivityTimer field in the configuration information.

Example B1 may include a method to define the new gap patterns for NCSG in NR, wherein the Visible Interruption Length (VIL), measurement length (ML) and visible interruption repetition period (VIRP) shall be included.

Example B2 may include the method of Example B1 or some other Example herein, wherein VIL can be defined depending on the numerology of deactivated SCC to be measured.

Example B3 may include the method of Example B1 or some other Example herein, wherein VIL can be defined depending on the frequency range (FR) of deactivated SCC to be measured.

Example B4 may include the method of Example B1 or some other Example herein, wherein ML can be up to SMTC configuration.

Example B5 may include the method of Example B1 or some other Example herein, wherein VIRP depends on the SCell measurement cycle configured for SCell.

Example B6 may include the method of Example B1 or some other Example herein, wherein the different patterns are defined regarding to synchronization between PCell and PSCell/SCell.

Example B7 may include a method comprising: receiving configuration information to define a gap pattern for network controlled small gap (NCSG) in a wireless cellular network, wherein the configuration information includes a Visible Interruption Length (VIL), a measurement length (ML), and a visible interruption repetition period (VIRP); and performing one or more measurements based on the gap pattern.

Example B8 may include the method of Example B7 or some other Example herein, wherein the VIL is based on a numerology of a deactivated secondary component carrier (SCC) to be measured.

Example B9 may include the method of Example B7-8 or some other Example herein, wherein the VIL is based on a frequency range (FR) of a deactivated SCC to be measured.

Example B10 may include the method of Example B7-9 or some other Example herein, wherein the ML is up to an SMTC configuration.

Example B11 may include the method of Example B7-10 or some other Example herein, wherein the VIRP depends on a secondary cell (SCell) measurement cycle configured for an SCell.

Example B12 may include the method of Example B7-11 or some other Example herein, wherein configuration information for a plurality of different gap patterns is received to provide synchronization between a PCell and a PSCell and/or SCell.

Example B13 may include the method of Example B7-12 or some other Example herein, wherein the method is performed by a UE or a portion thereof.

Example B14 may include a method comprising: determining configuration information to define a gap pattern for network controlled small gap (NCSG) in a wireless cellular network, wherein the configuration information includes a Visible Interruption Length (VIL), a measurement length (ML), and a visible interruption repetition period (VIRP); and encoding the configuration information for transmission to a user equipment (UE).

Example B15 may include the method of Example B14 or some other Example herein, wherein the VIL is based on a numerology of a deactivated secondary component carrier (SCC) to be measured.

Example B16 may include the method of Example B14-15 or some other Example herein, wherein the VIL is based on a frequency range (FR) of a deactivated SCC to be measured.

Example B17 may include the method of Example B14-16 or some other Example herein, wherein the ML is up to an SMTC configuration.

Example B18 may include the method of Example B14-17 or some other Example herein, wherein the VIRP depends on a secondary cell (SCell) measurement cycle configured for an SCell.

Example B19 may include the method of Example B14-18 or some other Example herein, wherein configuration information for a plurality of different gap patterns is determined and encoded to provide synchronization between a PCell and a PSCell and/or SCell.

Example B20 may include the method of Example B14-19 or some other Example herein, wherein the method is performed by a gNB or a portion thereof.

Example C1 may include a method to use NCSG in NR, where in NCSG and measurement gap are feasible for the legacy measurement if the measurement resource can be contained within VIL.

Example C2 may include the method to use NCSG in NR, wherein NCSG can be configured as one of instance of the multiple concurrent measurement gap patterns.

Example C3 may include a method comprising: determining configuration information for a plurality of concurrent measurement gap patterns for a UE, wherein the plurality of concurrent measurement gap patterns include a network-controlled small gap (NCSG); and encoding the configuration information for transmission to the UE.

Example C4 may include the method of Example C3 or some other Example herein, further comprising receiving one or more measurements from the UE that were performed using the measurement gap patterns.

Example C5 may include the method of Example C3-4 or some other Example herein, wherein the method is performed by a gNB or a portion thereof.

Example C6 may include a method comprising: receiving configuration information for a plurality of concurrent measurement gap patterns, wherein the plurality of concurrent measurement gap patterns include a network-controlled. small gap (NCSG); and performing one or more measurements based on the concurrent measurement gap patterns.

Example C7 may include the method of Example C6 or some other Example herein, further comprising sending a measurement report for the one or more measurements to a base station.

Example C8 may include the method of Example C6-7 or some other Example herein, wherein the method is performed by a UE or a portion thereof.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a user equipment (UE) configured for operation in a fifth-generation (5G) new radio (NR) network, the apparatus comprising: processing circuitry; and memory, the UE is capable of supporting a Network Controlled Small Gap (NCSG), wherein the processing circuitry is configured to:

decode signalling received from a generation node B (gNB) to configure the UE with a NCSG configuration for a NCSG pattern, wherein the NCSG pattern is configured with interruptions at the UE, wherein the NCSG configuration includes parameters comprising a first Visible Interruption Length (VIL1), a second VIL (VIL2), a measurement length (ML) and a visible interruption repetition period (VIRP), wherein the VIL1 comprises an interruption before the ML of the NCSG pattern and the VIL2 comprises an interruption after the ML of the NCSG pattern, the NCSG pattern repeating every VIRP, and perform synchronization signal block (SSB) based intra-frequency measurements on a deactivated secondary cell (Scell) in accordance with the NCSG pattern after the UE switches bandwidth parts (BWPs), wherein the memory is configured to store the parameters.

2. The apparatus of claim 1, wherein the processing circuitry is configured to decode a NeedForGapsConfigNR information element (IE) received from the gNB, the Need-ForGapsConfigNR IE to indicate one or more target NR frequency bands that the UE is requested to report measurement gap (MG) and NCSG requirement information.

3. The apparatus of claim 2, wherein the NeedForGapsConfigNR IE further indicates that the UE is to perform the SSB based measurements on one of the one or more target NR frequency bands.

4. The apparatus of claim 3, wherein the processing circuitry is to configure the UE to perform the SSB based intra-frequency measurements during at least one of the VIL1 and the VIL2.

5. The apparatus of claim 4, wherein the processing circuitry is to configure the UE to perform the SSB based intra-frequency measurements in accordance with the NCSG pattern when the SSB is not completely contained within an active BWP.

6. The apparatus of claim 4, wherein the processing circuitry is to configure the UE to perform the SSB based intra-frequency measurements without the NCSG pattern when the SSB is completely contained within an active BWP.

7. The apparatus of claim 4, wherein the processing circuitry is to configure the UE to refrain from communicating data with the gNB during the VIL1 and the VIL2, and wherein during the ML, the processing circuitry is to configure the UE to communicate data with the gNB.

8. The apparatus of claim 7, wherein the one of the one or more target NR frequency bands include a frequency range one (FR1) of the network and a frequency range two (FR2) of the network, wherein for the FR1, the VIL1 and the VIL2 are 1.0 milliseconds in length, and wherein for the FR2, the VIL1 and the VIL2 are 0.75 milliseconds in length.

9. The apparatus of claim 4, wherein the processing circuitry is configured to decode signalling to configure the UE with concurrent measurement gap patterns comprising the NCSG pattern and a measurement gap pattern, wherein the measurement gap pattern is activated for measurement of positioning reference signals (PRS) by the UE.

10. The apparatus of claim 1, wherein the processing circuitry comprises a baseband processor.

11. A non-transitory computer-readable storage medium that stores instructions for execution by processing circuitry of a user equipment (UE) configured for operation in a fifth-generation (5G) new radio (NR) network, the UE is capable of supporting a Network Controlled Small Gap (NCSG), the processing circuitry configured to:

decode signalling received from a generation node B (gNB) to configure the UE with a NCSG configuration for a NCSG pattern, wherein the NCSG pattern is configured with interruptions at the UE, wherein the NCSG configuration includes parameters comprising a first Visible Interruption Length (VIL1), a second VIL (VIL2), a measurement length (ML) and a visible interruption repetition period (VIRP), wherein the VIL1 comprises an interruption before the ML of the NCSG pattern and the VIL2 comprises an interruption after the ML of the NCSG pattern, the NCSG pattern repeating every VIRP, and perform synchronization signal block (SSB) based intra-frequency measurements on a deactivated secondary cell (Scell) in accordance with the NCSG pattern after the UE switches bandwidth parts (BWPs).

12. The non-transitory computer-readable storage medium of claim 11, wherein the processing circuitry is configured to decode a NeedForGapsConfigNR information element (IE) received from the gNB, the NeedForGapsConfigNR IE to indicate one or more target NR frequency bands that the UE is requested to report measurement gap (MG) and NCSG requirement information.

13. The non-transitory computer-readable storage medium of claim 12, wherein the NeedForGapsConfigNR IE further indicates that the UE is to perform the SSB based measurements on one of the one or more target NR frequency bands.

14. The non-transitory computer-readable storage medium of claim 13, wherein the processing circuitry is to configure the UE to perform the SSB based intra-frequency measurements during at least one of the VIL1 and the VIL2.

15. The non-transitory computer-readable storage medium of claim 14, wherein the processing circuitry is to configure the UE to perform the SSB based intra-frequency measurements in accordance with the NCSG pattern when the SSB is not completely contained within an active BWP.

16. The non-transitory computer-readable storage medium of claim 14, wherein the processing circuitry is to configure the UE to perform the SSB based intra-frequency measurements without the NCSG pattern when the SSB is completely contained within an active BWP.

17. The non-transitory computer-readable storage medium of claim 14, wherein the processing circuitry is to configure the UE to refrain from communicating data with the gNB during the VIL1 and the VIL2, and wherein during the ML, the processing circuitry is to configure the UE to communicate data with the gNB.

18. An apparatus for a generation node B (gNB) configured for operation in a fifth-generation (5G) new radio (NR) network, the apparatus comprising: processing circuitry; and memory, wherein for a user equipment (UE) that is capable of supporting a Network Controlled Small Gap (NCSG), the processing circuitry is configured to:

determine a NCSG pattern for a NCSG configuration with interruptions at the UE, wherein the NCSG configuration includes parameters comprising a first Visible Interruption Length (VIL1), a second VIL (VIL2), a measurement length (ML) and a visible interruption repetition period (VIRP), wherein the VIL1 comprises an interruption before the ML of the NCSG pattern and the VIL2 comprises an interruption after the ML of the NCSG pattern, the NCSG pattern repeating every VIRP, and encode signalling for transmission to configure the UE with the NCSG configuration for performance of synchronization signal block (SSB) based intra-frequency measurements on a deactivated secondary cell (Scell) in accordance with the NCSG pattern after the UE switches bandwidth parts (BWPs), wherein the memory is configured to store the parameters.

19. The apparatus of claim 18, wherein the processing circuitry is configured to encode a NeedForGapsConfigNR information element (IE) for transmission to the UE, the NeedForGapsConfigNR IE to indicate one or more target NR frequency bands that the UE is requested to report measurement gap (MG) and NCSG requirement information.

20. The apparatus of claim 19, wherein the NeedForGapsConfigNR IE is further encoded to indicate that the UE is to perform the SSB based measurements on one of the one or more target NR frequency bands, including a frequency range one (FR1) of the network and a frequency range two (FR2) of the network, wherein for the FR1, the VIL1 and the VIL2 are 1.0 milliseconds in length, and wherein for the FR2, the VIL1 and the VIL2 are 0.75 milliseconds in length.

\* \* \* \* \*